United States Patent [19]

Abbe

[11] 3,812,424

[45] May 21, 1974

[54] CAPACITIVE WIRE GAUGE

[75] Inventor: Robert C. Abbe, Newton, Mass.

[73] Assignee: ADE Corporation, Watertown, Mass.

[22] Filed: Mar. 15, 1973

[21] Appl. No.: 341,543

Related U.S. Application Data

[60] Continuation-in-part of Ser. No. 292,700, Sept. 27, 1972, Division of Ser. No. 64,240, Aug. 17, 1970, Pat. No. 3,706,919.

[52] U.S. Cl. ............................................. 324/61 R
[51] Int. Cl. ............................................ G01r 27/26
[58] Field of Search .......... 324/61 P, 61 R; 317/246

[56] References Cited
UNITED STATES PATENTS

| | | | |
|---|---|---|---|
| 2,950,436 | 8/1960 | Butticaz et al. | 324/61 P |
| 3,039,051 | 6/1962 | Locher | 324/61 P |
| 3,241,061 | 3/1966 | Quittner | 324/61 P |

*Primary Examiner*—Stanley T. Krawczewicz
*Attorney, Agent, or Firm*—Chittick, Thompson & Pfund

[57] ABSTRACT

An apparatus and method for gauging the cross sectional configuration of a conductive wire at a ground potential where the wire is placed within or passed through a tubular insulator having a tubular sensing electrode thereon and a pair of end electrodes located adjacent opposite ends of the sensing electrode. The sensing and end electrodes are surrounded by a conductive guard and all the electrodes and the guard are energized by alternating electric current. Measuring the capacitance between the sensing electrode and the wire provides an indication of the wire's cross sectional configuration. The energized guard and a shield maintained at ground potential and surrounding the guard eliminate the effects of stray environmental capacitance. The pair of end electrodes eliminate the fringe effects of the capacitive field at the ends of the sensing electrode.

24 Claims, 3 Drawing Figures

CAPACITIVE WIRE GAUGE

CROSS REFERENCE TO RELATED APPLICATIONS

This application is a continuation-in-part of applicant's copending application Ser. No. 292,700, filed Sept. 27, 1972, which is a division of Ser. No. 64,240, filed Aug. 17, 1970, now U.S. Pat. No. 3,706,919.

BACKGROUND OF THE INVENTION

This invention relates to gauging the cross sectional configuration of a wire by utilizing the capacitance between the wire and a sensing electrode and, more particularly, by so gauging the cross sectional configuration of a wire using a tubular sensing electrode.

Gauging the cross sectional configuration of a wire (e.g., determining the diameter of a circular wire) using a tubular sensing electrode in which the wire is placed has previously been attempted but such gauges have not provided results of sufficient precision. The signal obtained indicating the capacitance between the wire and the tubular sensing electrode has been very small in relation to the stray capacitance existing in the measuring environment. One possible solution for reducing the effect of this stray capacitance on the measurements made is to reduce the diameter of the tubular sensing electrode and, thereby, increase the measured capacitance with respect to the stray capacitance. However, such reduction causes the system to become extremely sensitive to eccentric placement of the wire inside the tubular sensing electrode.

Further, at the ends of the tubular sensing electrode, the capacitive field between the wire and sensing electrode has a fringe effect and is not all directed between the wire and sensing electrode. This fringe field adversely effects the precision with which the capacitance between the sensing electrode and wire may be measured.

OBJECTS AND SUMMARY OF THE INVENTION

It is, thus, a general object of this invention to provide a method and apparatus for gauging the cross sectional configuration of a wire by using a sensing electrode and, in particular, by placing the wire within a tubular sensing electrode where the capacitance between the wire and electrode provide an indication of the wire's cross sectional configuration.

It is a further object of this invention to provide such a method and apparatus which is easily practiced, may be economically manufactured and is precise.

It is another object to provide such an apparatus and method where the capacitance between the wire and sensing electrode may be measured without being unduly effected by stray capacitance in the measurement area.

It is a further object of this invention to provide such a capacitive gauging apparatus and method where fringe effects in the capacitive field at the ends of the sensing electrode are substantially avoided.

According to the invention, a conductive wire at a ground potential has its cross sectional configuration gauged by placing it within a tubular sensing electrode substantially surrounded by a conductive guard where both the sensing electrode and guard are energized with alternating electric current and the capacitance between the sensing electrode and the wire is measured to indicate the cross sectional configuration of the wire. The energized guard substantially eliminates the effect of environmental stray capacitance. Further, a grounded shield may be used which substantially surrounds the conductive guard and which is held at ground potential to further reduce any effects of stray capacitance in the environment.

To substantially reduce the fringe capacitive field effects at the ends of the sensing electrode, a pair of end electrodes are provided around the wire and located at the opposite ends of the sensing electrode. These end electrodes are energized along with the sensing electrode.

Preferably, the circuit for measuring the capacitance between the sensing electrode and the wire is one which contains a balancing or reference capacitance and provides an indication of the difference in capacitance between this balancing capacitance and the capacitance between the sensing electrode and the wire.

DESCRIPTION OF THE PREFERRED EMBODIMENT

Figure 1:
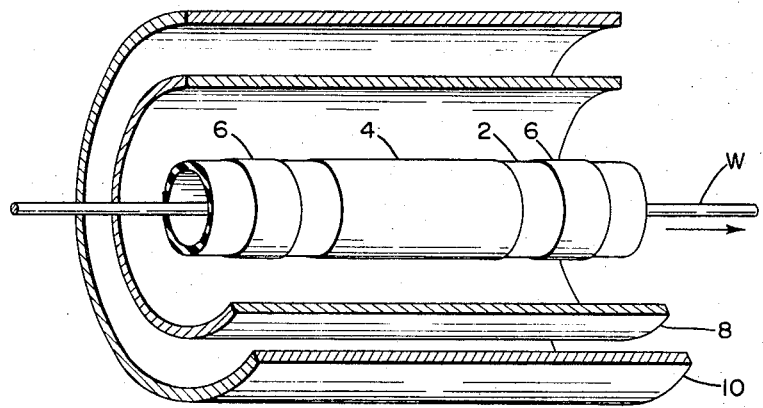
FIG. 1 is a broken-away partial perspective view of a preferred embodiment of the invention.

Referring to FIG. 1, a wire W whose cross sectional configuration is to be gauged is placed within a cylindrical tubular insulating tube 2. Preferably, the tube 2 is made of quartz. Deposited on the outside periphery of the tube is a cylindrical tubular sensing electrode 4 as well as a pair of cylindrical tubular end electrodes 6. The end electrodes, as illustrated, are located adjacent opposite ends of the sensing electrode 4. Surrounding the insulating tube 2 and its electrodes 4, 6, is located an electrically conductive guard 8 which is surrounded by a shield 10. To gauge the wire's cross sectional configuration along its length, it is moved longitudinally through the tube 2 as indicated in FIG. 1.

The method and apparatus of the invention gauges the cross sectional configuration of the wire W by measuring the capacitance between the sensing electrode 4 and the wire W. The wire W illustrated in FIG. 1 is circular so the measured capacitance provides an indication of its single independent dimension (its radius, diameter and circumference, of course, depend on each other) defining its cross sectional configuration. Where the wire is moved through the tube, the measured capacitance also indicates when that part of the moving wire passing through the sensing electrode is defective and has a change in cross section. With wires of other cross sectional shapes, the measured capacitance between the moving wire and the sensing electrode may also be used to indicate changes or defects which occur in the cross sectional configuration of the wire at the sensing electrode. However, since these other wires will have more than one independent dimension defining its cross section, the gauge will be unable to provide an indication of which dimension has changed. Thus, as used in this application, the term "gauging" refers to either measuring the cross sectional configuration of a wire or determining when a defect, discontinuity or like change occurs in the cross sectional configuration of a wire moving through the sensing electrode. The term "wire," of course, also refers to similar elongated conductive elements.

Figure 2:
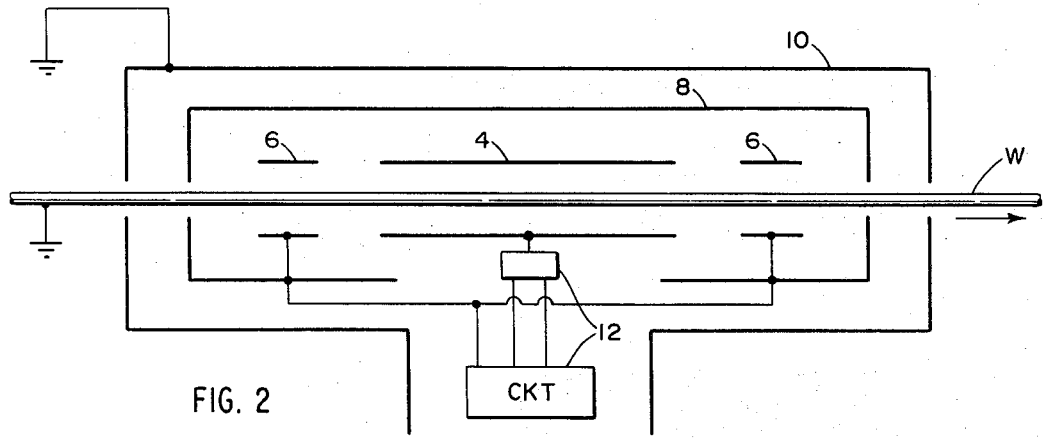
FIG. 2 is a schematic diagram of the preferred embodiment of the invention partly shown in FIG. 1.

Referring to FIG. 2, there is illustrated a schematic of the preferred embodiment partly shown in FIG. 1. As shown, the wire W is maintained at the ground reference potential of the system. Similarly, the outside shield 10 is also maintained at ground potential. The sensing electrode 4 and the pair of end electrodes 6 are energized from a measuring circuit 12 as is the electrically conductive guard 8. The measuring circuit 12 is electrically connected to the end electrodes and to the shield 8 with one lead and to the sensing electrode 4 with another lead.

The measuring circuit 12 energizes the sensing electrode 4, end electrodes 6, and conductive guard 8 and determines the capacitance between the grounded wire W and the sensing electrode 4. Preferably, the circuit 12 is of the type containing a balancing capacitor so that it provides an output indicative of the difference in capacitance between that of the balancing capacitor and that between the sensing electrode 4 and the wire W. The circuit 12 energizes the end electrodes 6 so that they generate capacitive fields adjacent both the opposite ends of the sensing electrode to reduce the unwanted stray fringe fields between the sensing electrode and wire at these ends. The end electrodes 6 tend to maintain the capacitive field at the ends of the sensing electrode directed between the wire and the sensing electrode. By eliminating the fringe fields, the end electrodes allow the capacitance between the wire W and sensing electrode 4 to be measured with greater precision.

The conductive guard 8 is also energized by the circuit 12 through that lead connecting to the end electrodes. The conductive guard 8 is energized to substantially reduce the effect of stray capacitance in the environment of the wire where it is being gauged so that the signal obtained upon measuring the capacitance between the wire and sensing electrode 4 has a better ratio with respect to this stray capacitance. To some extent, the end electrodes 6 also perform this function.

The use of the energized conductive guard 8, by so reducing the effects of stray capacitance, allows the diameter of the sensing electrode 4 to be made sufficiently large so that the gauge is not unduly effected by eccentric location of the wire W within the sensing electrode. As above noted, reducing the diameter of the sensing electrode to reduce the effects of stray environmental capacitance causes the measurements made to be greatly dependent on any such eccentric location.

The grounded shield 10 surrounding the energized conductive guard 8 further eliminates the effect of stray capacitance in the environment. The grounded shield is, however, optional. Of course, such a grounded shield could not be used without the energized conductive guard 8 since its inherent capacitance would greatly hinder measurement of the capacitance between the wire W and sensing electrode 4.

The sensing electrode 4, end electrodes 6 and conductive guard 8 are all energized with AC current from the circuit 12 and are preferably maintained at substantially the same instantaneous potentials.

Figure 3:
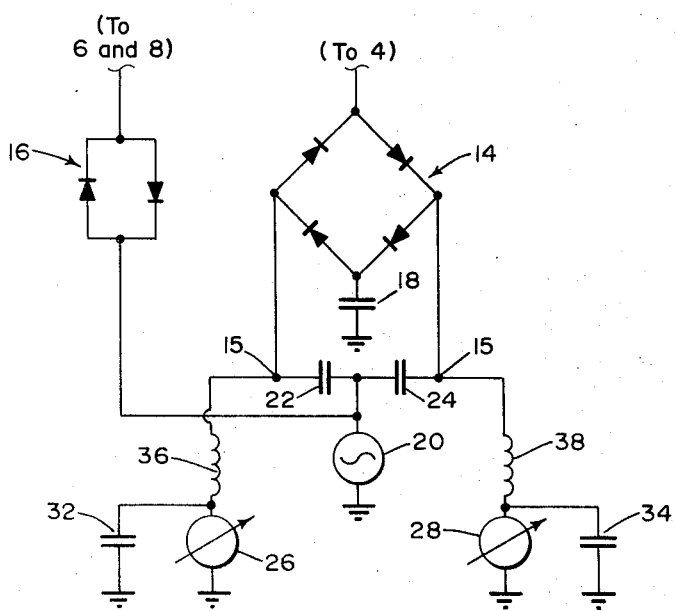
FIG. 3 is a schematic circuit diagram of the measuring circuit shown as blocks in FIG. 2.

FIG. 3 illustrates preferred internal elements of the measuring circuit 12 shown as blocks in FIG. 2. The measuring circuit of FIG. 3 is basically that disclosed in the copending applications previously referenced. Such a circuit is extremely good for measuring small capacitance values. The circuit of FIG. 3 energizes the electrodes 4, 6 and the conductive shield 8 and provides an indication of the capacitance between the wire W and sensing electrode 4. The circuit contains a conventional AC source 20 which provides an AC output through two DC blocking capacitors 22 and 24 to a diode matrix circuit 14. The diode matrix may be considered as having left and right arms, each containing a pair of diodes which are arranged to conduct in series. The AC signal from source 20 after passing through capacitors 22 and 24 is applied to each arm between its diodes. The upper junction between the two arms of the matrix circuit 14 is connected to the sensing electrode 4 as shown in FIG. 2. The lower junction between the two arms is connected to a balancing, or reference, capacitor 18 which is grounded. Preferably, the balancing capacitor 18 is chosen as approximately equal to the expected normal capacitance between the wire and sensing electrode. The diode matrix, as shown, operates to feed the AC current flowing through each capacitor 22 and 24 so that the right arm conducts current during the positive polarity to the balancing capacitor 18 while, during this polarity, the left arm conducts current to the sensing electrode 4. Further, during the negative polarity of the excitation from AC source 20, the left arm conducts current to the balancing capacitor 18 while the right arm conducts current to the sensing electrode 4.

This excitation through the diode matrix 14 causes charge to be built up at the junctions 15 illustrated when the capacitance to ground of the balancing capacitor is different than the capacitance between the grounded wire W and the sensing electrode 4. This charge is conducted to ground through a pair of low pass filters, each having an inductor 36, 38 and a grounded capacitor 32, 34, and through grounded DC current meters 26 and 28. The average current through each meter coincides with the average current through one of the arms of said matrix circuit and provides an indication of the difference in capacitance between the grounded balancing conductor 18 and the capacitance being measured between the wire and sensing electrode 4. The reading of each meter thus indicates the cross sectional configuration of the wire within the sensing electrode at that time. Of course, only one meter need be used. Further, since the average current being measured varies with the cross sectional configuration being measured in a non-linear manner, a linearizing circuit may be included at the input of each current meter so that the meters provide a reading which varies linearly with the measured capacitance.

As shown in FIG. 3, the AC source 20 also provides its output through a diode circuit 16 to energize the end electrodes 6 and the energized guard 8. As above noted, it is desired to maintain the instantaneous potential of the sensing electrode equal to the instantaneous potentials of the end electrodes 6 and the guard 8. Thus, the diodes in circuit 16 are utilized and chosen to cause a voltage drop across the circuit 16 equal to the voltage drop caused by the diode matrix circuit 14 when the AC source 20 energizes the sensing electrode 4. Of course, the diode circuit 16 has its diodes arranged to conduct both polarities of the AC excitation of source 20.

Referring to FIGS. 2 and 3 together, the measuring circuit shown in FIG. 2 is located within the grounded shield and a portion of the circuit, made up of the diode matrix circuit 14 and balancing capacitor 18 of FIG. 3, is located within the energized guard 8. This arrangement is preferable since the internal elements of the measuring circuit 12 will normally be affected by stray environmental capacitance. Placing the circuit 12 within the shield as shown and also between the ends of the sensing electrode 4 protects these internal elements from the stray capacitance and also balances any remaining effects of this stray capacitance on the measuring circuit with its effects on the measured capacitance between the wire and sensing electrode. The diode matrix 14 and balancing capacitor 18 are particularly effected by stray capacitance and further protected by being located within the energized guard 8.

If desired, the diode matrix 14 and capacitor 18 may be connected at junctions 15 to the rest of the FIG. 3 measuring circuit by a cable surrounded by a grounded guard so that the measured capacitance may be indicated at a remote location. Such an arrangement is particularly suitable where the wire is being moved through the sensing electrode to check for defects in its cross sectional configuration. Of course, the final signal indicating the measured capacitance between the sensing electrode and wire may be suitably amplified before being applied to a meter as 26, 28 or otherwise utilized.

Although a preferred embodiment of the invention is shown, it is to be understood that the invention is not so limited. It will further be appreciated that various changes in the form and details of the above-described preferred embodiment may be made by those skilled in the art without departing from the true spirit and scope of the invention.

I claim:

1. An apparatus for gauging the cross sectional configuration of a conductive wire at ground potential comprising:
    a tubular sensing electrode within which the wire is placed;
    a conductive guard substantially surrounding said sensing electrode;
    means for energizing said electrode and guard with alternating electric current; and
    means for measuring the capacitance between said electrode and wire to obtain an indication of the cross sectional configuration of the wire within said electrode.

2. The apparatus as recited in claim 1 wherein said electrode is cylindrical.

3. The apparatus as recited in claim 1 and further including an insulating tubular member on which said electrode is mounted.

4. The apparatus as recited in claim 3 wherein said insulating tubular member contains quartz.

5. The apparatus as recited in claim 1 and further including a shield member substantially surrounding said conductive guard and maintained at ground potential.

6. The apparatus as recited in claim 5 wherein said measuring means is a circuit located between the ends of said sensing electrode and within said shield.

7. The apparatus as recited in claim 1 and further including a pair of tubular end electrodes within which the wire is also placed and which are located adjacent the opposite ends of said sensing electrode.

8. The apparatus as recited in claim 1 wherein said sensing electrode and guard are maintained at approximately the same instantaneous potential.

9. The apparatus as recited in claim 1 wherein said measuring means comprises:
    a grounded balancing capacitor energized with alternating electric current at approximately the same instantaneous potential as is said sensing electrode;
    a matrix circuit for directing alternating current to said sensing electrode and to said balancing capacitor, said matrix circuit having first and second arms, each arm conducting current during one polarity of said alternating current to said sensing electrode and to said balancing capacitor during the other polarity of said alternating current, said first arm conducting current to said sensing electrode and balancing capacitor during polarities opposite to those during which said second arm conducts current to said sensing electrode and balancing capacitor; and
    means for measuring the average current through at least one of said arms of said matrix circuit, said average current being indicative of the difference in the capacitance to ground between said balancing capacitor and said sensing electrode and the wire.

10. The apparatus as recited in claim 9 and further including means for blocking the DC component from said energizing means and applying the remaining AC component to said matrix circuit.

11. The apparatus as recited in claim 9: wherein said arms of said matrix circuit contain diodes; wherein said energizing means energizes said sensing electrode through said matrix circuit; wherein said energizing means is a single AC source for energizing both said sensing electrode and said conductive guard; and further including a circuit adapted to conduct current of both polarities from said AC source to said conductive guard, the voltage drop across said circuit being approximately the same as the voltage drop across said matrix circuit so that said conductive guard and said sensing electrode are maintained at approximately the same instantaneous potential.

12. The apparatus as recited in claim 9 wherein said balancing capacitor and said matrix circuit are located within said conductive guard.

13. The apparatus as recited in claim 1 wherein said wire is circular in cross sectional shape.

14. An apparatus for gauging the cross-sectional configuration of a conductive wire at a ground potential comprising:
    a tubular sensing electrode within which the wire is placed;
    a pair of tubular end electrodes within which the wire is also placed and which are located adjacent the opposite ends of said sensing electrode;
    means for energizing said tubular and end electrodes with substantially the same instantaneous alternating electric potential; and
    means for measuring the capacitance between said sensing electrode and wire to obtain an indication of the cross sectional configuration of the wire within said sensing electrode.

15. The apparatus as recited in claim 14 and further including a conductive guard substantially surrounding said sensing and end electrodes and also energized with alternating electric current.

16. The apparatus as recited in claim 15 wherein said sensing electrode, end electrodes and conductive guard are maintained at approximately the same instantaneous potential.

17. The apparatus as recited in claim 15 further including a shield member substantially surrounding said conductive guard and maintained at ground potential.

18. The apparatus as recited in claim 15 wherein said wire is circular in cross sectional shape.

19. A method of gauging the cross sectional configuration of a conductive wire at ground potential comprising:
    placing said wire within a tubular sensing electrode substantially surrounded by a conductive guard;
    energizing said electrode and conductive guard with alternating electric current; and
    measuring the capacitance between said electrode and the wire to obtain an indication of the cross sectional configuration of the wire within said sensing electrode.

20. The method as recited in claim 19 and further including the step of substantially surrounding said conductive guard with a shield maintained at ground potential.

21. The method as recited in claim 19 and further including the steps of also placing said wire within a pair of tubular end electrodes located adjacent the opposite ends of said sensing electrode, and energizing said end electrodes with alternating electric current to maintain said end electrodes at approximately the same instantaneous potential as said sensing electrode.

22. The method as recited in claim 19 and further comprising the step of moving said wire longitudinally through said tubular sensing electrode.

23. A method of gauging the cross sectional configuration of a conductive wire at a ground potential comprising;
    placing said wire within a tubular sensing electrode and within a pair of tubular end electrodes located adjacent the opposite ends of said sensing electrode;
    energizing said sensing and end electrodes with substantially the same instantaneous alternating electric potential to maintain them at approximately the same instantaneous potential; and
    measuring the capacitance between said sensing electrode and the wire to obtain an indication of the cross sectional configuration of the wire within said sensing electrode.

24. The method as recited in claim 23 and further including the step of moving said wire longitudinally through said tubular sensing and end electrodes.

* * * * *